(12) United States Patent
Friedrich et al.

(10) Patent No.: US 11,981,304 B2
(45) Date of Patent: *May 14, 2024

(54) MULTIPLE-CIRCUIT HYDRAULICALLY OPEN BRAKING SYSTEM, IN PARTICULAR FOR A HIGHLY AUTOMATED OR AUTONOMOUS VEHICLE

(71) Applicant: Robert Bosch GmbH, Stuttgart (DE)

(72) Inventors: Thomas Friedrich, Ingersheim (DE); Dirk Drotleff, Oberstenfeld-Gronau (DE); Ralf Kleemann, Benningen Am Neckar (DE); Daniel Brenndoerfer, Ludwigsburg (DE); Bernd Hienz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 799 days.

This patent is subject to a terminal disclaimer.

(21) Appl. No.: 17/046,239

(22) PCT Filed: Apr. 5, 2019

(86) PCT No.: PCT/EP2019/058586
§ 371 (c)(1),
(2) Date: Oct. 8, 2020

(87) PCT Pub. No.: WO2019/201619
PCT Pub. Date: Oct. 24, 2019

(65) Prior Publication Data
US 2021/0039616 A1 Feb. 11, 2021

(30) Foreign Application Priority Data
Apr. 20, 2018 (DE) .................... 10 2018 206 082.7

(51) Int. Cl.
*B60T 13/58* (2006.01)
*B60T 7/12* (2006.01)
(Continued)

(52) U.S. Cl.
CPC ............ *B60T 13/148* (2013.01); *B60T 8/885* (2013.01); *B60T 13/686* (2013.01)

(58) Field of Classification Search
CPC . B60T 8/326; B60T 8/92; B60T 13/58; B60T 8/4081; B60T 13/142; B60T 13/686; B60T 7/12
See application file for complete search history.

(56) References Cited

U.S. PATENT DOCUMENTS 11,148,651 B2 * 10/2021 Hienz ...................... B60T 7/12
11,505,169 B2 * 11/2022 Friedrich .............. B60T 13/686
(Continued)

FOREIGN PATENT DOCUMENTS

CN 102056779 A 5/2011
CN 104097621 A 10/2014
(Continued)

OTHER PUBLICATIONS

International Search Report corresponding to PCT Application No. PCT/EP2019/058586, dated Jun. 4, 2019 (German and English language document) (7 pages).

*Primary Examiner* — Yuri Kan
(74) *Attorney, Agent, or Firm* — Maginot, Moore & Beck LLP (57) ABSTRACT

A multi-circuit, hydraulically open brake system includes a first pressure generator assigned to a main system with a first energy supply and a first evaluation and control unit (ECU), and is connectable via a first shut-off valve to wheel brake(s) of a first brake circuit and via a second shut-off valve to wheel brake(s) of a second brake circuit. A second pressure generator is assigned to a secondary system which includes a second energy supply and a second ECU, and is connectable via a third shut-off valve to wheel brake(s) of the first brake circuit and via a fourth shut-off valve to wheel brake(s) of the second brake circuit. The second ECU controls the second pressure generator. Components of the modulation unit for individual brake pressure modulation are assigned to the main system, and the components are controlled by the first ECU and are supplied by the first energy supply.

20 Claims, 5 Drawing Sheets

(51) Int. Cl.
*B60T 8/17* (2006.01)
*B60T 8/88* (2006.01)
*B60T 13/14* (2006.01)
*B60T 13/16* (2006.01)
*B60T 13/68* (2006.01)

(56) References Cited

U.S. PATENT DOCUMENTS

| | | |
|---|---|---|
| 11,554,765 B2 * | 1/2023 | Leiber .................. B60T 13/142 |
| 2013/0213025 A1 | 8/2013 | Linden |
| 2014/0152085 A1 * | 6/2014 | Biller .................. B60T 8/4081 |
| | | 303/14 |
| 2014/0203626 A1 * | 7/2014 | Biller .................. B60T 13/58 |
| | | 303/14 |
| 2015/0151726 A1 * | 6/2015 | McClain .................. B60T 8/92 |
| | | 303/15 |
| 2016/0009267 A1 | 1/2016 | Lesinski, Jr. |

FOREIGN PATENT DOCUMENTS

| | | |
|---|---|---|
| CN | 104724093 A | 6/2015 |
| CN | 105764759 A | 7/2016 |
| CN | 107428325 A | 12/2017 |
| DE | 10 2009 001 135 A1 | 8/2010 |
| DE | 10 2013 227 065 A1 | 6/2015 |
| DE | 10 2015 204 866 A1 | 9/2016 |
| DE | 10 2016 211 982 A1 | 1/2018 |
| WO | 2011/029812 A1 | 3/2011 |
| WO | 2012/143313 A1 | 10/2012 |
| WO | 2012/150120 A1 | 11/2012 |
| WO | 2015/173134 A1 | 11/2015 |

\* cited by examiner

MULTIPLE-CIRCUIT HYDRAULICALLY OPEN BRAKING SYSTEM, IN PARTICULAR FOR A HIGHLY AUTOMATED OR AUTONOMOUS VEHICLE

This application is a 35 U.S.C. § 371 National Stage Application of PCT/EP2019/058586, filed on Apr. 5, 2019, which claims the benefit of priority to Serial No. DE 10 2018 206 082.7, filed on Apr. 20, 2018 in Germany, the disclosures of which are incorporated herein by reference in their entirety.

The disclosure proceeds from a multiple-circuit hydraulically open brake system, in particular for a highly automated or autonomous vehicle. The subject matter of the present disclosure is also an operating method for a multiple-circuit hydraulically open brake system of this type.

Vehicles with at least one highly automated or autonomous driving function are known from the prior art, which vehicles can at least partially take over an actual driving task. As a result, the vehicles can drive in a highly automated or autonomous manner, by the vehicles, for example, detecting the course of the road, other road users or obstacles automatically, and calculating the corresponding actuation commands in the vehicle and forwarding them to the actuators in the vehicle, as a result of which the driving course of the vehicle is influenced correctly. In the case of a highly automated or autonomous vehicle of this type, the driver is as a rule not involved in the driving activities. Nevertheless, measures and means are provided which enable the driver to be able to intervene himself/herself at any time in the driving activities.

In addition, brake systems for vehicles are known from the prior art, which brake systems are designed for an actuation by way of a vehicle driver using a hydraulic intervention. As a result, it is ensured in the case of a failure of the brake system that the driver can still exert sufficient brake force on the wheels of the vehicle by way of actuation of the brake pedal. This design decisively influences the topology of current brake systems. Thus, for example, the size of a tandem brake master cylinder can be based on the maintenance of satisfactory performance on the fallback level. In addition, the brake systems can be configured as what are known as coupled brake systems or power-assisted brake systems. Said systems are also realized, however, in such a way that there is still a hydraulic intervention by way of the driver as the fallback level. Power-assisted brake systems are unsuitable for highly automated or autonomous vehicles, since a driver is no longer present there for boosting purposes during an autonomous driving function and the brake system has to build up the brake energy in a completely independent manner.

DE 10 2013 227 065 A1 has disclosed a hydraulic brake system and a method for operating a brake system of this type. The hydraulic brake system comprises a brake master cylinder, at least one wheel brake cylinder, a first brake pressure generator and a second brake pressure generator. Here, the brake master cylinder can be connected hydraulically via the second brake pressure generator to the at least one wheel brake cylinder. Here, the first brake pressure generator and the second brake pressure generator can be connected hydraulically in parallel or in series between the brake master cylinder and the at least one wheel brake cylinder.

DE 10 2009 001 135 A1 has disclosed a method for the actuation of a hydraulic vehicle brake system. The vehicle brake system comprises an electromechanical brake booster and a traction control system. Here, the vehicle brake system is actuated by way of the brake booster in situations, in the case of which a brake pedal is not actuated, for example in order to limit a vehicle speed or for distance control from a preceding vehicle or in the case of parking.

SUMMARY

The multiple-circuit hydraulically open brake system, in particular for a highly automated or autonomous vehicle, with the features disclosed herein and the corresponding operating method for a multiple-circuit hydraulically open brake system of this type have the advantage that a simple, robust and inexpensive brake system architecture without mechanical and/or hydraulic intervention via the driver is provided, which brake system architecture enables sufficient brake performance by way of a suitable redundancy concept even in the case of a fault.

Embodiments of the disclosed brake system have fewer components than known brake systems, since fewer valves, no pedal travel simulator, and no mechanism for generating, boosting and forwarding the driver's pressure are required, with the result that lower brake system costs are produced. In addition, this results in lower system costs, since there is only one hydraulic connector at the wheel brakes and no alternative solutions with two connectors in the brake caliper are required, which connectors act on different pistons.

Moreover, this results in lower integration costs at the vehicle manufacturer, since the embodiments of the disclosure enable a simple installation, in particular for right-hand drive and left-hand drive vehicles, on account of the electric actuation without mechanical and/or hydraulic intervention via the driver, and free up installation space on the bulkhead between the engine compartment and the vehicle interior compartment. Since none of the brake system actuators have to be mounted on the bulkhead, this can also result in NVH (Noise, Vibration, Harshness) advantages. In addition, the smaller number of components results in a lower weight and volume in comparison with known brake systems.

A modular concept with two assemblies can be implemented simply by way of the division into a main system and a secondary system.

Embodiments of the present disclosure provide a multiple-circuit hydraulically open brake system, in particular for a highly automated or autonomous vehicle, with at least two wheel brakes which are assigned in each case to one brake circuit with a pressure relief path, two pressure generators which are connected hydraulically in parallel between at least one fluid vessel and the at least two wheel brakes, and a modulation unit for the hydraulic connection of the pressure generators to the at least two wheel brakes and for the individual brake pressure modulation in the at least two wheel brakes. Here, a first pressure generator is assigned to a main system which comprises a first energy supply and a first evaluation and control unit, and can be connected via a first shut-off valve to at least one wheel brake of a first brake circuit and via a second shut-off valve to at least one wheel brake of a second brake circuit. A second pressure generator is assigned to a secondary system which comprises a second energy supply, which is independent of the first energy supply, and a second evaluation and control unit, and can be connected via a third shut-off valve to at least one wheel brake of the first brake circuit and via a fourth shut-off valve to at least one wheel brake of the second brake circuit. The second evaluation and control unit actuates the second pressure generator, components of the modulation unit for the individual brake pressure modulation being assigned to the main system, with the result that said components of the modulation unit and the first pressure generator are actuated by the first evaluation and control unit and are supplied with energy by the first energy supply.

In addition, an operating method is proposed for a multiple-circuit hydraulically open brake system of this type, in particular for a highly automated or autonomous vehicle. During normal operation, the main system increases or reduces or holds the pressure in the brake circuits by means of the first pressure generator, and carries out the individual brake pressure modulation in the at least two wheel brakes by means of the modulation unit. In the case of failure of the main system, the secondary system increases or reduces or holds the pressure in the brake circuits by means of the second pressure generator, and the individual brake pressure modulation in the at least two wheel brakes is dispensed with.

A hydraulically open brake system is understood to mean a brake system, in the case of which brake fluid which is discharged during an individual brake pressure modulation can be returned from the wheel brakes via a pressure relief path to the fluid vessel.

Various regulating functions, such as an anti-lock brake control system ABS, a traction control system ASR, or a driving dynamics regulation system FDR or ESP for the longitudinal and transverse stabilization of the vehicle, can be implemented in an advantageous way by way of the individual brake pressure modulation in the individual wheel brakes. Since said regulating functions are known per se, they will not be described in greater detail here.

In the present case, the evaluation and control unit can be understood to mean an electric unit, such as a control unit, which processes and/or evaluates detected sensor signals. The evaluation and control unit can have at least one interface which can be configured as hardware and/or software. In the case of a configuration as hardware, the interfaces can be, for example, part of what is known as a system ASIC which comprises a very wide variety of functions of the evaluation and control unit. It is also possible, however, that the interfaces are dedicated, integrated circuits or consist at least partially of discrete components. In the case of an embodiment as software, the interfaces can be software modules which are present, for example, on a microcontroller in addition to other software modules. A computer program product with program code is also advantageous, which program code is stored on a machine-readable medium such as a semiconductor memory, a hard disk memory or an optical memory and is used to carry out the evaluation when the program is run by the evaluation and control unit.

Sensor units are provided for the detection of the sensor signals, said sensor units being understood in the present case to be modules which comprise at least one sensor element which detects a physical variable and/or a change in a physical variable directly or indirectly and preferably converts it into an electric sensor signal. This can take place, for example, via the emitting and/or the receiving of soundwaves and/or electromagnetic waves and/or via a magnetic field or the change in a magnetic field and/or the receiving of satellite signals, for example of a GPS signal. A sensor unit of this type can comprise, for example, acceleration sensor elements which detect acceleration-relevant information of the vehicle, and/or sensor elements which determine objects and/or obstacles and/or other crash-relevant vehicle environmental data and provide them for evaluation. Sensor elements of this type can be based, for example, on video and/or radar and/or LIDAR and/or PMD and/or ultrasonic technologies. In addition, signals and information of an existing ABS sensor system and the variables which are derived in the control unit which is provided for this purpose can also be evaluated. In a manner which is based on the acceleration-relevant information and/or variables determined therefrom, for example, a vehicle movement and a vehicle position in three-dimensional space can be estimated and can be evaluated for accident detection.

For the positional determination of the vehicle, for example, global navigation satellite systems (GNSS) can be used. Here, GNSS is used as a collective term for the use of existing and future global satellite systems such as NAVSTAR GPS (Global Positioning System) from the United States of America, GLONASS (Global Navigation Satellite System) from the Russian Federation, Galileo from the European Union, Beidou from the People's Republic of China, etc.

A highly automated or autonomous vehicle is understood to mean a vehicle which has at least one highly automated or autonomous driving function which can at least partially take over an actual driving task. Via said at least one highly automated or autonomous driving function, the vehicle detects, for example, the course of the road, other road users or obstacles autonomously, and calculates the corresponding actuating commands which are forwarded to the actuators in the vehicle, as a result of which the driving course of the vehicle is influenced correctly. In the case of a highly automated or autonomous vehicle of this type, the driver is as a rule not involved in the driving activities. Nevertheless, measures and means, for example in the form of electric or electronic actuating elements, are provided which enable the driver to be able to intervene himself/herself at any time in the driving activities. The brake request which is generated by the driver by means of the actuating elements is then forwarded via electric signals to the main system and/or the secondary system. There is not, however, a mechanical and/or hydraulic intervention by way of the driver.

The at least one driving function evaluates vehicle data which are detected by internal sensor units for the trajectory planning, such as ABS interventions, steering angle, position, direction, speed, acceleration, etc., and/or vehicle environmental data which are detected, for example, via camera, radar, LIDAR and/or ultrasonic sensor units, and actuates the evaluation and control units of the main system and the secondary system correspondingly, in order to generate a desired brake pressure and/or to realize stabilization operations in the longitudinal and/or transverse direction by way of individual brake pressure modulation in the wheel brakes.

The measures and developments which are specified below enable advantageous improvements of the multiple-circuit hydraulically open brake system discussed above, in particular for a highly automated or autonomous vehicle, and of the operating method for a multiple-circuit hydraulically open brake system of this type, in particular for a highly automated or autonomous vehicle.

It is particularly advantageous that the first pressure generator can be of single-circuit configuration and the second pressure generator can be of dual-circuit configuration. As an alternative, the first pressure generator and the second pressure generator can be of dual-circuit configuration. As a further alternative, the first pressure generator can be of dual-circuit configuration and the second pressure generator can be of single-circuit configuration. Here, the single-circuit configuration of a pressure generator means that the two brake circuits are supplied by one chamber or by one pump of the pressure generator. Here, the dual-circuit configuration of a pressure generator means that in each case one brake circuit is supplied by one chamber or by one pump of the pressure generator.

In a further advantageous refinement of the brake system, the shut-off valves can be actuated by the first evaluation and control unit and/or by the second evaluation and control unit in such a way that, in the case of activation of one of the two pressure generators, a hydraulic fluid is not conducted through the other one of the two pressure generators. Thus, for example, the first shut-off valve and the second shut-off valve can be configured in each case as normally closed solenoid valves, and the third shut-off valve and the fourth shut-off valve can be configured as normally open solenoid valves, the first evaluation and control unit actuating the shut-off valves. Therefore, in the case of said embodiment, the shut-off valves belong to the main system and are supplied with energy by the first energy supply unit. As a result of the normally closed configuration of the first shut-off valve and the second shut-off valve, the first pressure generator is disconnected hydraulically from the wheel brakes. As a result of the normally open configuration of the third shut-off valve and the fourth shut-off valve, the second pressure generator is connected hydraulically to the wheel brakes. Therefore, during normal operation, during which the first pressure generator generates the pressure for the wheel brakes, an actuation of the shut-off valves is required, in order to connect the first pressure generator hydraulically to the wheel brakes and to disconnect the second pressure generator hydraulically from the wheel brakes. In addition, the wheel brakes are connected via the second pressure generator to the at least one fluid vessel, in order for it to be possible, in the currentless or passive state, for a temperature-induced expansion of the brake fluid to be compensated for by way of what is known as "breathing". Therefore, "breathing by way of the secondary system" is spoken about in this context.

As an alternative, the first shut-off valve and the second shut-off valve can be configured in each case as normally open solenoid valves, and the third shut-off valve and the fourth shut-off valve can be configured as normally closed solenoid valves, the second evaluation and control unit actuating the shut-off valves. Therefore, in the case of said embodiment, the shut-off valves belong to the secondary system and are supplied with energy by the second energy supply unit. As a result of the normally open configuration of the first shut-off valve and the second shut-off valve, the first pressure generator is connected hydraulically to the wheel brakes. As a result of the normally closed configuration of the third shut-off valve and the fourth shut-off valve, the second pressure generator is disconnected hydraulically from the wheel brakes. Therefore, during normal operation, during which the first pressure generator generates the pressure for the wheel brakes, an actuation of the shut-off valves is not required, in order to connect the first pressure generator hydraulically to the wheel brakes, and to disconnect the second pressure generator hydraulically from the wheel brakes. In addition, the wheel brakes are connected via the first pressure generator to the at least one fluid vessel, in order for it to be possible, in the currentless or passive state, for a temperature-induced expansion of the brake fluid to be compensated for by way of what is known as "breathing". Therefore, "breathing by way of the main system" is spoken about in this context.

In a further advantageous refinement of the brake system, the main system and the secondary system can have a common fluid vessel. As an alternative, a first fluid vessel with at least one fluid chamber can be assigned to the main system, and a second fluid vessel with at least one fluid chamber can be assigned to the secondary system. Thus, for example, the fluid vessels can have a fluid chamber for each circuit of the pressure generators. This means that the first fluid vessel can comprise one fluid chamber in the case of a single-circuit first pressure generator and two fluid chambers in the case of a dual-circuit first pressure generator, it being possible for the second fluid vessel to comprise one fluid chamber in the case of a single-circuit second pressure generator and two fluid chambers in the case of a dual-circuit second pressure generator.

In a further advantageous refinement of the brake system, the first pressure generator can be configured as a plunger system or as a pump system. On account of the open architecture, the first pressure generator which is configured as a plunger system is capable of recharging or replenishing fluid. Here, the shut-off valves advantageously prevent the plunger system from sucking in brake fluid from the wheel brakes during the recharging operation. Furthermore, in each case one suction line with a check valve can be provided for the first plunger system in each brake circuit, which suction line additionally connects the first plunger system hydraulically to the fluid vessel. As a result, the recharging operation can be carried out more rapidly, in particular at low temperatures. In an analogous manner, the second pressure generator can be configured as a plunger system or as a pump system. Here, a plunger system of this type can have a piston/cylinder unit with at least one piston and at least one chamber and with a drive, it being possible for the drive to move the at least one piston for pressure setting in the at least one chamber counter to the force of a restoring spring. This means that a single-circuit pressure generator comprises one chamber and one piston. A dual-circuit pressure generator comprises two chambers and two pistons. A pump system of this type can have at least one pump and at least one drive which can drive the at least one pump. This means that a single-circuit pressure generator comprises one pump. A dual-circuit pressure generator comprises two pumps which can be driven in each case by one drive or by a common drive.

The configuration of the first pressure generator as a plunger system results in satisfactory NVH performance in the overall system, and simpler and/or more precise monitoring and improved regulation. This makes it possible that both the position and volume and pressure build-up information can be detected more simply and, in particular, more precisely in the main system in comparison with other concepts (pump system). The configuration of the second pressure generator as a plunger system results in highly satisfactory NVH performance both during normal operation and in the case of failure of the main system. The configuration of the second pressure generator as a pump system results in even lower costs, installation space and weight in comparison with other concepts (plunger system).

The modulation unit can comprise in each case one inlet valve and in each case one outlet valve for each wheel brake for the individual brake pressure modulation. The inlet valves can be configured, for example, as controllable normally open solenoid valves. The outlet valves can be configured, for example, as electromagnetic normally closed switching valves or as controllable normally closed solenoid valves. As a result of said configuration of the modulation unit, it is possible in an advantageous way to use inlet valves and/or outlet valves of ESP systems which are already known, and to achieve very low overall system costs for an already existing economy of scale (ESP is installed millions of times). Furthermore, a first wheel brake and a second wheel brake can be assigned to the first brake circuit, and a third wheel brake and a fourth wheel brake can be assigned to the second brake circuit. Here, both an X-type division, that is to say, the wheel brake of the left-hand front wheel and the wheel brake of the right-hand rear wheel are assigned to the first brake circuit, and the wheel brake of the right-hand front wheel and the wheel brake of the left-hand rear wheel are assigned to the second brake circuit, and an II-type division of the brake circuits, that is to say, the wheel brake of the left-hand front wheel and the wheel brake of the right-hand front wheel are assigned to the first brake circuit, and the wheel brake of the left-hand rear wheel and the wheel brake of the right-hand rear wheel are assigned to the second brake circuit, are possible.

In a further advantageous refinement of the brake system, during an individual brake pressure modulation in the at least one wheel brake, brake fluid which is discharged from the at least one wheel brake can be returned via the at least one pressure relief path either into the first fluid vessel or into the second fluid vessel. As a result of a defined return of this type into only one fluid vessel, there are defined filling states there. In the case of a return into the two fluid vessels, a filling level compensation means with additional hardware and monitoring of the filling levels would additionally be required, which would cause higher costs.

In a further advantageous refinement of the brake system, the first pressure generator, the second pressure generator and the modulation unit can be arranged in a common hydraulic block. Here, the shut-off valves can also be arranged in said common hydraulic block. As an alternative, the first pressure generator and the modulation unit can be arranged in a first hydraulic block, and the second pressure generator can be arranged in a second hydraulic block. In the case of said embodiment, depending on the assignment, the shut-off valves can be divided among the two hydraulic blocks or can be arranged jointly in one of the two hydraulic blocks.

In one advantageous refinement of the operating method, the first shut-off valve and the second shut-off valve can be transferred during normal operation into the open state, and the third shut-off valve and the fourth shut-off valve can be transferred into the closed state, the drive of the first pressure generator being actuated correspondingly in order to increase the pressure or in order to reduce the pressure or in order to hold the pressure in the brake circuits.

In a further advantageous refinement of the operating method, during normal operation, the associated inlet valve can be opened and the associated outlet valve can be closed in order to increase the pressure individually in an associated wheel brake. The associated inlet valve and the associated outlet valve can be closed in order to hold the pressure individually in an associated wheel brake. The associated inlet valve can be closed and the associated outlet valve can be opened in order to reduce the pressure individually in an associated wheel brake.

In a further advantageous refinement of the operating method, in the case of failure of the main system, the first shut-off valve and the second shut-off valve can be transferred into the closed state, and the third shut-off valve and the fourth shut-off valve can be transferred into the open state, the drive of the second pressure generator being actuated correspondingly in order to increase the pressure or in order to reduce the pressure or in order to hold the pressure in the brake circuits.

Exemplary embodiments of the disclosure are shown in the drawing and will be described in greater detail in the following description. In the drawing, identical designations denote components or elements which carry out identical or analogous functions.

DETAILED DESCRIPTION

As can be seen from FIGS. 1 to 5, the exemplary embodiments which are shown of a multiple-circuit hydraulically open brake system 1, 1A, 1B, 1C, 1D according to the disclosure, in particular for a highly automated or autonomous vehicle, in each case comprise at least two wheel brakes RB1, RB2, RB3, RB4 which are in each case assigned to a brake circuit BK1, BK2 with a pressure relief path 9.1, 9.2, two pressure generators 12, 22 which are connected hydraulically in parallel between at least one fluid vessel 17, 27 and the at least two wheel brakes RB1, RB2, RB3, RB4, and a modulation unit 16, 16A, 16B, 16C, 16D for the hydraulic connection of the pressure generators 12, 22 to the at least two wheel brakes RB1, RB2, RB3, RB4 and for the individual brake pressure modulation in the at least two wheel brakes RB1, RB2, RB3, RB4. Here, a first pressure generator 12 is assigned to a main system 10, 10A, 10B, 10C, 10D which comprises a first energy supply EV1 and a first evaluation and control unit 14, and can be connected via a first shut-off valve V1 to at least one wheel brake RB1, RB2 of a first brake circuit BK1 and via a second shut-off valve V2 to at least one wheel brake RB3, RB4 of a second brake circuit BK2. A second pressure generator 22 is assigned to a secondary system 20, 20A, 20B, 20C, 20D which comprises a second energy supply EV2, which is independent from the first energy supply EV1, and a second evaluation and control unit 24, and can be connected via a third shut-off valve V3 to at least one wheel brake RB1, RB2 of the first brake circuit BK1 and via a fourth shut-off valve V4 to at least one wheel brake RB3, RB4 of the second brake circuit BK2. The second evaluation and control unit 24 actuates the second pressure generator 22, components of the modulation unit 16, 16A, 16B, 16C, 16D for the individual brake pressure modulation being assigned to the main system 10, 10A, 10B, 10C, 10D, with the result that said components of the modulation unit 16, 16A, 16B, 16C, 16D and the first pressure generator 12 are actuated by the first evaluation and control unit 14 and are supplied with energy by the first energy supply EV1.

The shut-off valves V1, V2, V3, V4 can be actuated by the first evaluation and control unit 14 and/or by the second evaluation and control unit 24 in such a way that, in the case of activation of one of the two pressure generators 12, 22, a hydraulic fluid is not conducted through the other one of the two pressure generators 12, 22.

As can be seen from FIGS. 1 to 5, furthermore, the brake systems 1, 1A, 1B, 1C, 1D which are shown comprise in each case two brake circuits BK1, BK2 with in each case one pressure relief path 9.1, 9.2 and four wheel brakes RB1, RB2, RB3, RB4, a first wheel brake RB1 and a second wheel brake RB2 and a first pressure relief path 9.1 being assigned to a first brake circuit BK1, and a third wheel brake RB3 and a fourth wheel brake RB4 and a second pressure relief path 9.2 being assigned to a second brake circuit. Here, an X-type division of the wheel brakes RB1, RB2, RB3, RB4 among the two brake circuits BK1, BK2 is possible, that is to say the first wheel brake RB1 is arranged on the left-hand front wheel, and the second wheel brake RB2 is arranged on the right-hand rear wheel, and the third wheel brake RB2 is arranged on the right-hand front wheel, and the fourth wheel brake RB4 is arranged on the left-hand rear wheel. As an alternative, an II-type division of the wheel brakes RB1, RB2, RB3, RB4 among the two brake circuits BK1, BK2 is also possible, that is to say the first wheel brake RB1 is arranged on the left-hand front wheel, and the second wheel brake RB2 is arranged on the right-hand front wheel, and the third wheel brake RB3 is arranged on the left-hand rear wheel, and the fourth wheel brake RB4 is arranged on the right-hand rear wheel. In addition, a first fluid vessel 17 with at least one fluid chamber 17.1, 17.2 is assigned to the main system 10, 10A, 10B, 10C, 10D, and a second fluid vessel 27 with at least one fluid chamber 27.1, 27.2 is assigned to the secondary system 20, 20A, 20B, 20C, 20D. In addition, the two fluid vessels 17, 27 can be combined to form a common fluid vessel 7.

As can be seen from FIGS. 2 to 5, furthermore, the first pressure generator 12 in the exemplary embodiments of the brake system 1, 1A, 1B, 1C, 1D which are shown is configured in each case as a plunger system 12A, 12B. The second pressure generator 22 is likewise configured in each case as a plunger system 22A, 22B in the exemplary embodiments of the brake system 1, 1A, 1B, 1C, 1D which are shown. In the case of alternative exemplary embodiments (not shown), the two pressure generators 12, 22 or at least one of the two pressure generators 12, 22 can be configured as a pump system.

As can be seen from FIGS. 2 to 5, furthermore, the modulation unit 16, 16A, 16B, 16C, 16D comprises in each case one inlet valve IV1, IV2, IV3, IV4 for each wheel brake RB1, RB2, RB3, RB4 in the exemplary embodiments of the brake system 1, 1A, 1B, 1C, 1D which are shown, which inlet valves IV1, IV2, IV3, IV4 are configured as controllable normally open solenoid valves, and also comprises in each case one outlet valve OV1, OV2, OV3, OV4, which outlet valves OV1, OV2, OV3, OV4 are configured as electromagnetic normally closed switching valves. As an alternative, the outlet valves OV1, OV2, OV3, OV4 can be configured as controllable normally closed solenoid valves. Here, a first inlet valve IV1 and a first outlet valve OV1 are assigned to the first wheel brake RB1. A second inlet valve IV2 and a second outlet valve OV2 are assigned to the second wheel brake RB2. A third inlet valve IV3 and a third outlet valve OV3 are assigned to the third wheel brake RB3, and a fourth inlet valve IV4 and a fourth outlet valve OV4 are assigned to the fourth wheel brake RB4. In addition, during an individual brake pressure modulation in the at least one wheel brake RB1, RB2, RB3, RB4, brake fluid which is discharged via an associated outlet valve OV1, OV2, OV3, OV4 is returned from the at least one wheel brake RB1, RB2, RB3, RB4 via the at least one pressure relief path 9.1, 9.2 either into the first fluid vessel 17 or into the second fluid vessel 27. In the exemplary embodiments which are shown, the brake fluid or hydraulic fluid is returned from the wheel brakes RB1, RB2, RB3, RB4 into the first fluid vessel 17 which is assigned to the main system 10, 10A, 10B, 10C, 10D.

As can be seen from FIGS. 2 to 5, furthermore, the first pressure generator 12, the second pressure generator 22 and the modulation unit 16 are arranged in a common hydraulic block in the case of the exemplary embodiments which are shown, in which common hydraulic block the corresponding hydraulic connecting lines or connecting ducts are also configured. In addition, the shut-off valves V1, V2, V3, V4 are also arranged in said common hydraulic block. In the case of an alternative exemplary embodiment (not shown), the first pressure generator 12 and the modulation unit 16 are arranged in a first hydraulic block, and the second pressure generator 22 is arranged in a second hydraulic block. In the case of said alternative exemplary embodiment, the first fluid vessel is connected to the first hydraulic block or is integrated into the first hydraulic block, and the second fluid vessel 27 is connected to the second hydraulic block or is integrated into the second hydraulic block.

Figure 1:
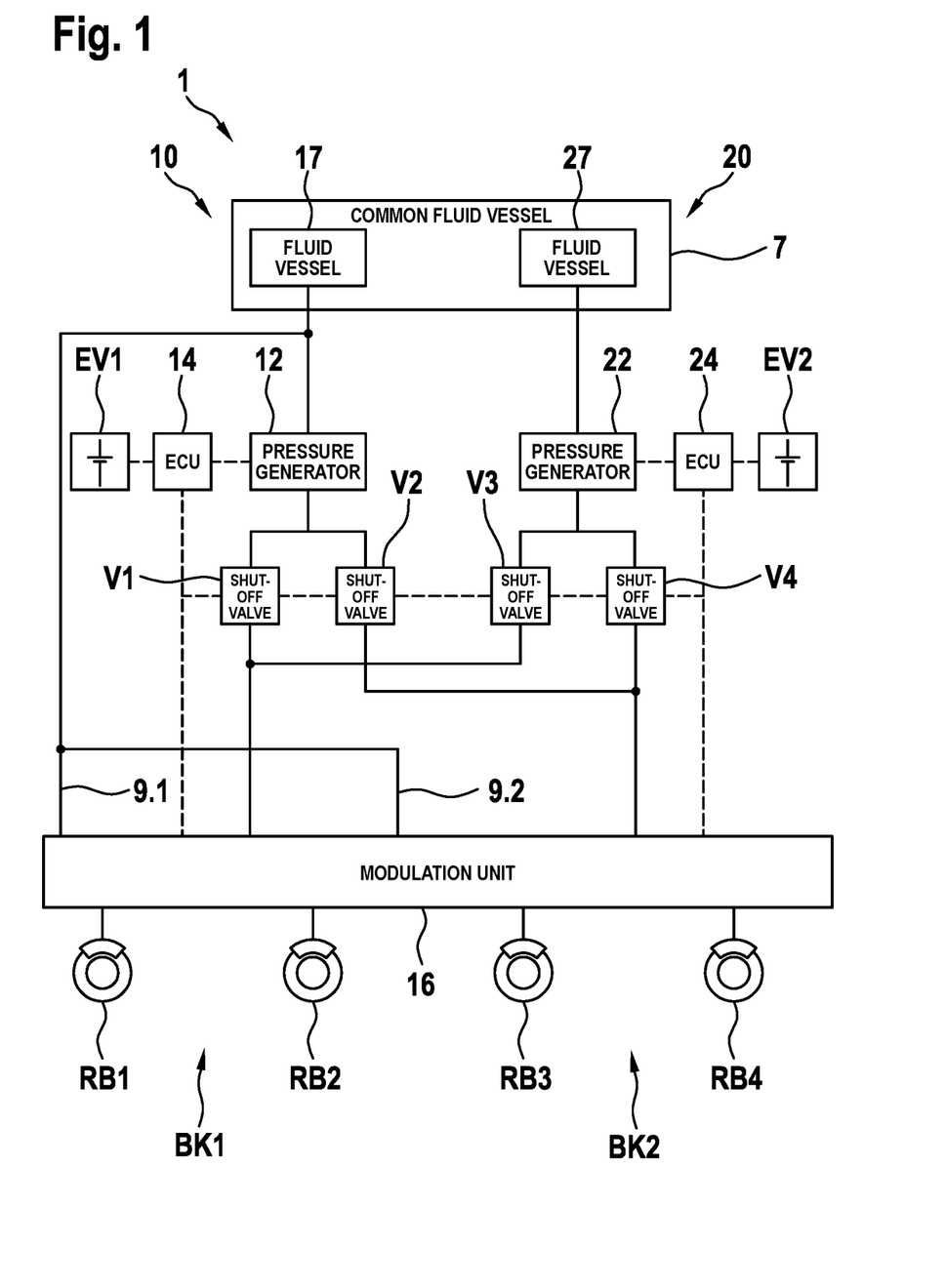
FIG. 1 shows a diagrammatic block diagram of one exemplary embodiment of a multiple-circuit hydraulically open brake system according to the disclosure, in particular for a highly automated or autonomous vehicle.
Figure 2:
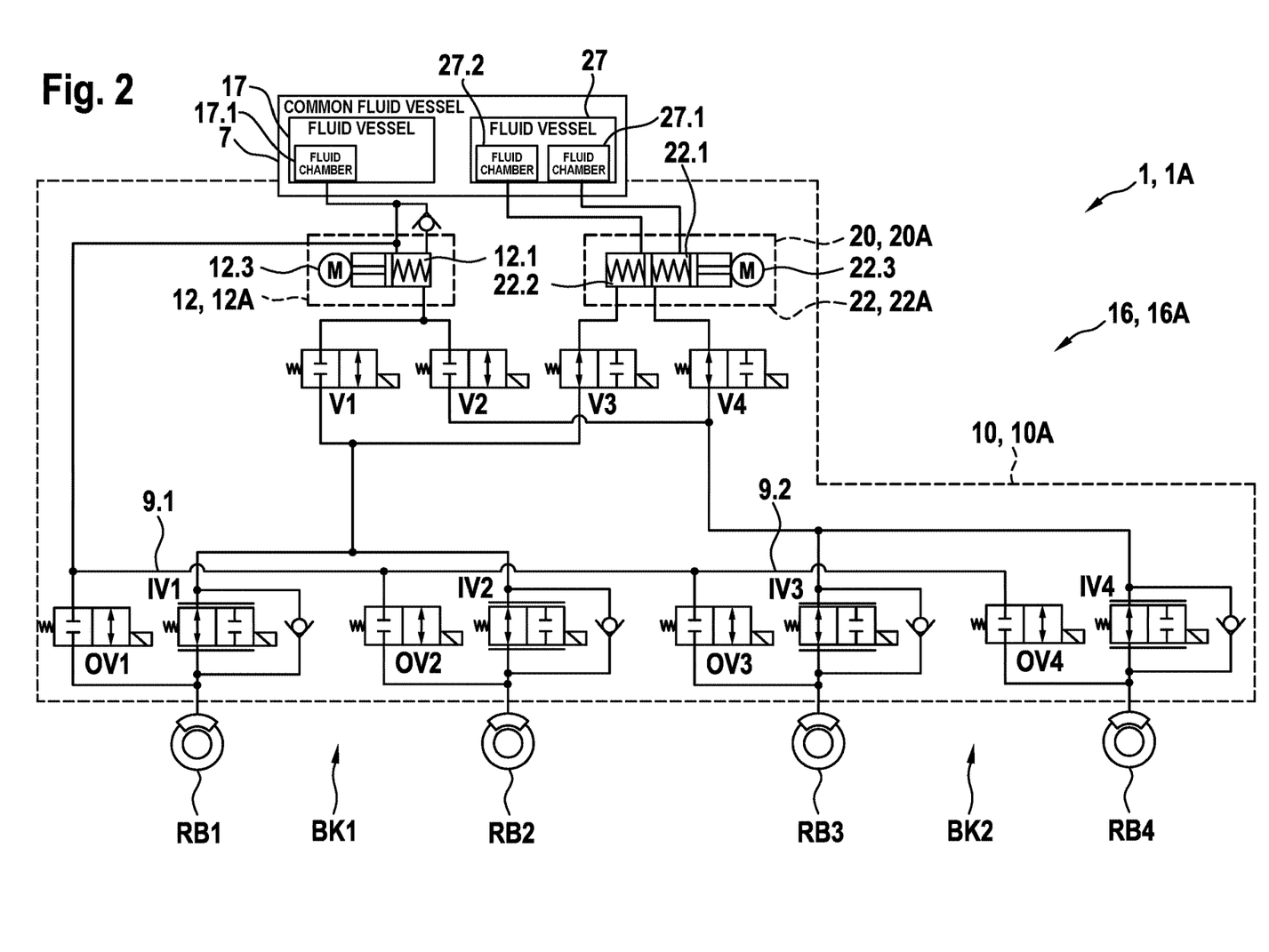
FIG. 2 shows a diagrammatic hydraulic circuit diagram of a first exemplary embodiment of a multiple-circuit hydraulically open brake system according to the disclosure, in particular for a highly automated or autonomous vehicle.

As can be seen from FIG. 2, furthermore, the first pressure generator 12 in the first exemplary embodiment which is shown of the brake system 1A is of single-circuit configuration and comprises a plunger system 12A with a piston/cylinder unit which has a piston and a chamber 12.1, and a drive 12.3. The drive 12.3 is configured as an electric motor and moves the piston for pressure setting in the chamber 12.1 counter to the force of a restoring spring. The second pressure generator 22 is of dual-circuit configuration and comprises a plunger system 22A with a piston/cylinder unit which has two pistons and two chambers 22.1, 22.2, and a drive 22.3. The drive 22.3 is configured as an electric motor and drives the two pistons in the chambers 22.1, 22.2 for pressure setting counter to the force of corresponding restoring springs.

As can be seen from FIG. 2, furthermore, in the exemplary embodiment which is shown, the first shut-off valve V1 and the second shut-off valve V2 are configured in each case as normally closed solenoid valves, and the third shut-off valve V3 and the fourth shut-off valve V4 are configured as normally open solenoid valves, the first evaluation and control unit 14 actuating the shut-off valves V1, V2, V3, V4. Therefore, in the case of said embodiment, the shut-off valves V1, V2, V3, V4 belong to the main system 10A and are supplied with energy by the first energy supply unit EV1. As a result of the normally closed configuration of the first shut-off valve V1 and the second shut-off valve V2, the first pressure generator 12 is disconnected hydraulically from the wheel brakes RB1, RB2, RB3, RB4. As a result of the normally open configuration of the third shut-off valve V3 and the fourth shut-off valve V4, the second pressure generator 22 is connected hydraulically to the wheel brakes RB1, RB2, RB3, RB4. Therefore, during normal operation, during which the first pressure generator 12 generates the pressure for the wheel brakes RB1, RB2, RB3, RB4, an actuation of the shut-off valves V1, V2, V3, V4 is required, in order to connect the first pressure generator 12 hydraulically to the wheel brakes RB1, RB2, RB3, RB4, and to disconnect the second pressure generator 22 hydraulically from the wheel brakes RB1, RB2, RB3, RB4. In addition, the wheel brakes RB1, RB2, RB3, RB4 are connected via the second pressure generator 22 to the second fluid vessel 27, in order, in the currentless or passive state, for it to be possible for a temperature-induced expansion of the brake fluid to be compensated for by way of what is known as "breathing". Therefore, "breathing through the secondary system 20A" is spoken of in this context.

As can be seen from FIG. 2, furthermore, in the exemplary embodiment which is shown, the first shut-off valve V1 and the second shut-off valve V2 are configured in each case as normally closed solenoid valves, and the third shut-off valve V3 and the fourth shut-off valve V4 are configured as normally open solenoid valves, the first evaluation and control unit 14 actuating the shut-off valves V1, V2, V3, V4. Therefore, in the case of said embodiment, the shut-off valves V1, V2, V3, V4 belong to the main system 10A and are supplied with energy by the first energy supply unit EV1. As a result of the normally closed configuration of the first shut-off valve V1 and the second shut-off valve V1, the first pressure generator 12 is disconnected hydraulically from the wheel brakes RB1, RB2, RB3, RB4. As a result of the normally open configuration of the third shut-off valve V3 and the fourth shut-off valve V4, the second pressure generator 22 is connected hydraulically to the wheel brakes RB1, RB2, RB3, RB4. Therefore, during normal operation, during which the first pressure generator 12 generates the pressure for the wheel brakes RB1, RB2, RB3, RB4, an actuation of the shut-off valves V1, V2, V3, V4 is required, in order to connect the first pressure generator 12 hydraulically to the wheel brakes RB1, RB2, RB3, RB4, and to disconnect the second pressure generator 22 hydraulically from the wheel brakes RB1, RB2, RB3, RB4. In addition, the wheel brakes RB1, RB2, RB3, RB4 are connected via the second pressure generator 22 to the second fluid vessel 27, in order, in the currentless or passive state, for it to be possible for a temperature-induced expansion of the brake fluid to be compensated for by way of what is known as "breathing". Therefore, "breathing through the secondary system 20A" is spoken of in this context.

Figure 3:
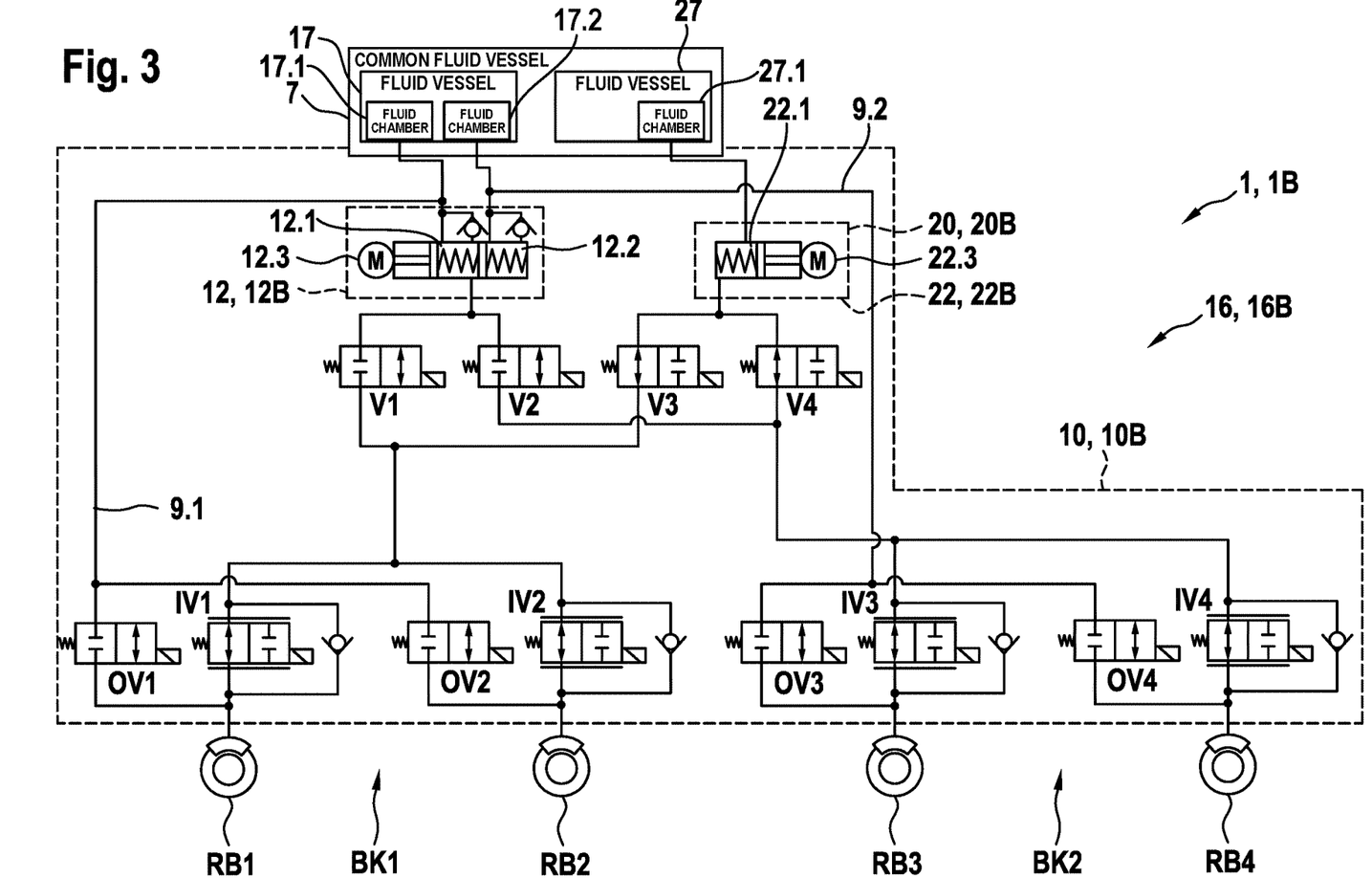
FIG. 3 shows a diagrammatic hydraulic circuit diagram of a second exemplary embodiment of a multiple-circuit hydraulically open brake system according to the disclosure, in particular for a highly automated or autonomous vehicle.

As can be seen from FIG. 3, furthermore, in the second exemplary embodiment which is shown of the brake system 1B, the first pressure generator 12 is of dual-circuit configuration, and comprises a plunger system 12B with a piston/cylinder unit which has two pistons and two chambers 12.1, 12.2, and a drive 12.3. The drive 12.3 is configured as an electric motor and moves the two pistons for pressure setting in the chambers 12.1, 12.2 counter to the force of corresponding restoring springs. The second pressure generator 22 is of single-circuit configuration, and comprises a plunger system 22B with a piston/cylinder unit which has a piston and a chamber 22.1, and a drive 22.3. The drive 22.3 is configured as an electric motor and moves the piston for pressure setting in the chamber 12.1 counter to the force of a restoring spring.

As can be seen from FIG. 3, furthermore, the first fluid vessel 17 comprises two fluid chambers 17.1, 17.2, a first fluid chamber 17.1 being connected hydraulically to a first chamber 12.1 of the first plunger system 12B and a first pressure relief path 9.1. A second fluid chamber 17.2 is connected hydraulically to a second chamber 12.2 of the first plunger system 12B and a second pressure relief path 9.2. In addition, the first chamber 12.1 is assigned to the first brake circuit BK1, and the second chamber 12.2 is assigned to the second brake circuit BK2. In addition, the two suction lines with a check valve are provided for the first pressure generator 12, which suction lines additionally connect the chambers 12.1, 12.2 of the first plunger system 12B hydraulically to the first fluid vessel 17. The second fluid vessel 27 comprises only one fluid chamber 27.1 which is connected hydraulically to the chamber 22.1 of the second plunger system 22B. Therefore, the chamber 22.1 of the second plunger system 22B is assigned to the first brake circuit BK1 and the second brake circuit BK2. The piston/cylinder units of the first and second plunger system 12B, 22B are configured such that flow can pass through them in the currentless state, with the result that brake fluid can flow through the corresponding chambers 12.1, 12.2, 22.1.

As can be seen from FIG. 3, furthermore, in the exemplary embodiment which is shown, the first shut-off valve V1 and the second shut-off valve V2 are configured in each case as normally open solenoid valves, and the third shut-off valve V3 and the fourth shut-off valve V4 are configured as normally closed solenoid valves, the second evaluation and control unit 14 actuating the shut-off valves V1, V2, V3, V4. Therefore, in the case of said embodiment, the shut-off valves V1, V2, V3, V4 belong to the secondary system 20B and are supplied with energy by the second energy supply unit EV2. As a result of the normally open configuration of the first shut-off valve V1 and the second shut-off valve V2, the first pressure generator 12 is connected hydraulically to the wheel brakes RB1, RB2, RB3, RB4. As a result of the normally closed configuration of the third shut-off valve V3 and the fourth shut-off valve V4, the second pressure generator 22 is disconnected hydraulically from the wheel brakes RB1, RB2, RB3, RB4. Therefore, during normal operation, during which the first pressure generator 12 generates the pressure for the wheel brakes RB1, RB2, RB3, RB4, an actuation of the shut-off valves V1, V2, V3, V4 is not required, in order to connect the first pressure generator 12 hydraulically to the wheel brakes RB1, RB2, RB3, RB4, and in order to disconnect the second pressure generator 22 hydraulically from the wheel brakes RB1, RB2, RB3, RB4. In addition, the wheel brakes RB1, RB2, RB3, RB4 are connected via the first pressure generator 22 to the first fluid vessel 17, in order, in the currentless or passive state, for it to be possible for a temperature-induced expansion of the brake fluid to be compensated for by what is known as "breathing". Therefore, "breathing through the main system 10B" is spoken of in this context.

Figure 4:
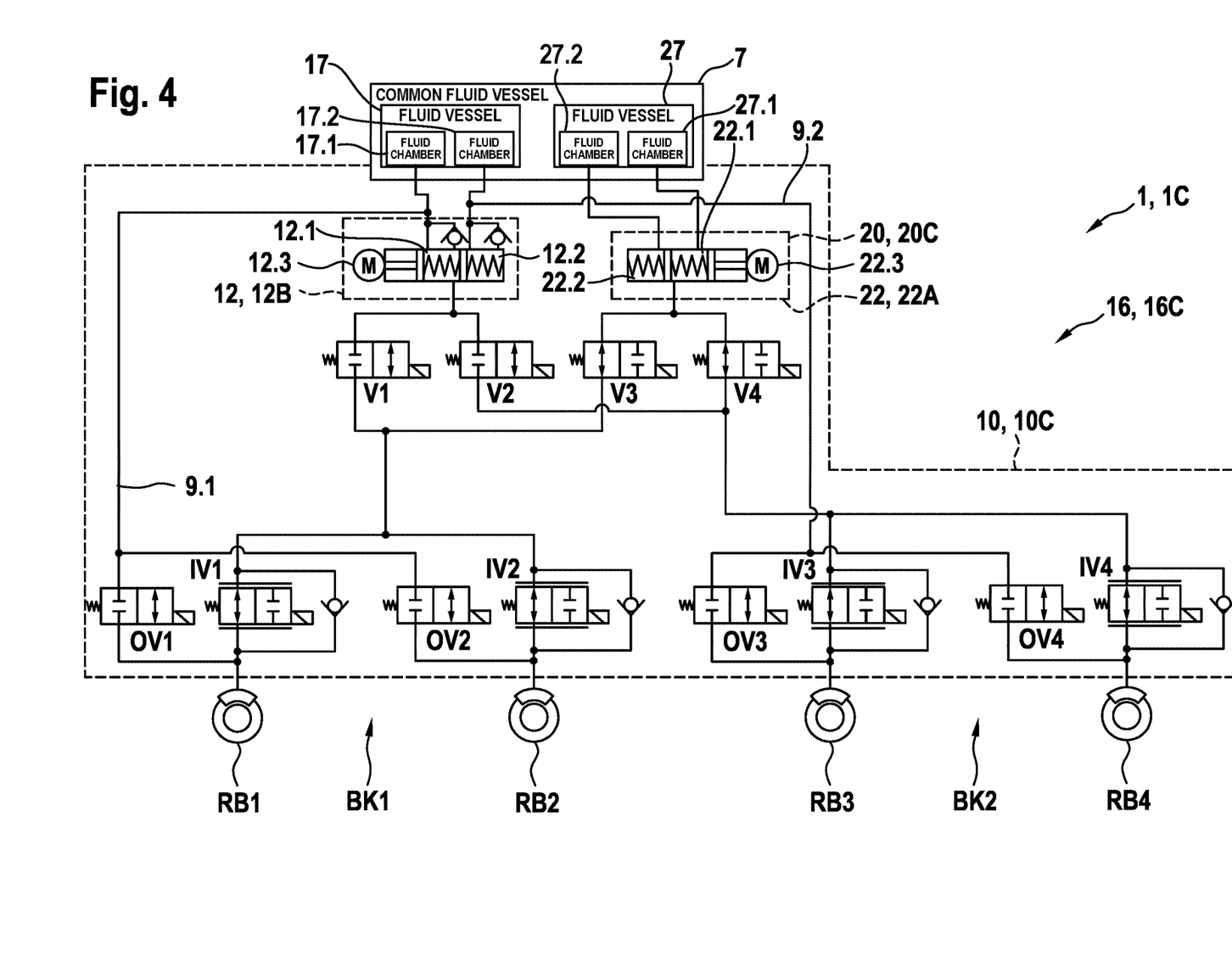
FIG. 4 shows a diagrammatic hydraulic circuit diagram of a third exemplary embodiment of a multiple-circuit hydraulically open brake system according to the disclosure, in particular for a highly automated or autonomous vehicle.

As can be seen from FIG. 4, furthermore, in the third exemplary embodiment which is shown of the brake system 1C, the first pressure generator 12 is of dual-circuit configuration and comprises a plunger system 12B with a piston/cylinder unit, which has two pistons and two chambers 12.1, 12.2, and a drive 12.3. The drive 12.3 is configured as an electric motor and moves the two pistons for pressure setting in the chambers 12.1, 12.2 counter to the force of corresponding restoring springs. The second pressure generator 22 is of dual-circuit configuration and comprises a plunger system 22A with a piston/cylinder unit, which has two pistons and two chambers 22.1, 22.2, and a drive 22.3. The drive 22.3 is configured as an electric motor and moves the two pistons for pressure setting in the chambers 22.1, 22.2 counter to the force of corresponding restoring springs.

As can be seen from FIG. 4, furthermore, the first fluid vessel 17 comprises two fluid chambers 17.1, 17.2, a first fluid chamber 17.1 being connected hydraulically to a first chamber 12.1 of the first plunger system 12B and a first pressure relief path 9.1. A second fluid chamber 17.2 is connected hydraulically to a second chamber 12.2 of the first plunger system 12B and a second pressure relief path 9.2. In addition, the first chamber 12.1 is assigned to the first brake circuit BK1, and the second chamber 12.2 is assigned to the second brake circuit BK2. In addition, two suction lines with a check valve are provided for the first pressure generator 12, which suction lines additionally connect the chambers 12.1, 12.2 of the first plunger system 12B hydraulically to the first fluid vessel 17. The second fluid vessel 27 comprises two fluid chambers 27.1, 27.2, a first fluid chamber 27.1 being connected hydraulically to a first chamber 22.1 of the second plunger system 22A, and a second fluid chamber 27.2 being connected hydraulically to a second chamber 22.2 of the second plunger system 22A. In addition, the first chamber 22.1 is assigned to the second brake circuit BK2, and the second chamber 22.2 is assigned to the first brake circuit BK1. The piston/cylinder units of the first and second plunger system 12A, 22A are configured such that flow can pass through them in the currentless state, with the result that brake fluid can flow through the corresponding chambers 12.1, 12.2, 22.1, 22.2.

As can be seen from FIG. 4, furthermore, in the exemplary embodiment which is shown, the first shut-off valve V1 and the second shut-off valve V2 are configured in each case as normally closed solenoid valves, and the third shut-off valve V3 and the fourth shut-off valve V4 are configured as normally open solenoid valves, the first evaluation and control unit 14 actuating the shut-off valves V1, V2, V3, V4. Therefore, in the case of said embodiment, the shut-off valves V1, V2, V3, V4 belong to the main system 10C, and are supplied with energy by the first energy supply unit EV1. As a result of the normally closed configuration of the first shut-off valve V1 and the second shut-off valve V2, the first pressure generator 12 is disconnected hydraulically from the wheel brakes RB1, RB2, RB3, RB4. As a result of the normally open configuration of the third shut-off valve V3 and the fourth shut-off valve V4, the second pressure generator 22 is connected hydraulically to the wheel brakes RB1, RB2, RB3, RB4. Therefore, during normal operation, during which the first pressure generator 12 generates the pressure for the wheel brakes RB1, RB2, RB3, RB4, an actuation of the shut-off valves V1, V2, V3, V4 is required, in order to connect the first pressure generator 12 hydraulically to the wheel brakes RB1, RB2, RB3, RB4, and to disconnect the second pressure generator 22 hydraulically from the wheel brakes RB1, RB2, RB3, RB4. In addition, the wheel brakes RB1, RB2, RB3, RB4 are connected via the second pressure generator 22 to the second fluid vessel 27, in order for it to be possible, in the currentless or passive state, for a temperature-induced expansion of the brake fluid to be compensated for by way of what is known as "breathing". Therefore, "breathing by way of the secondary system 20C" is spoken of in this context.

Figure 5:
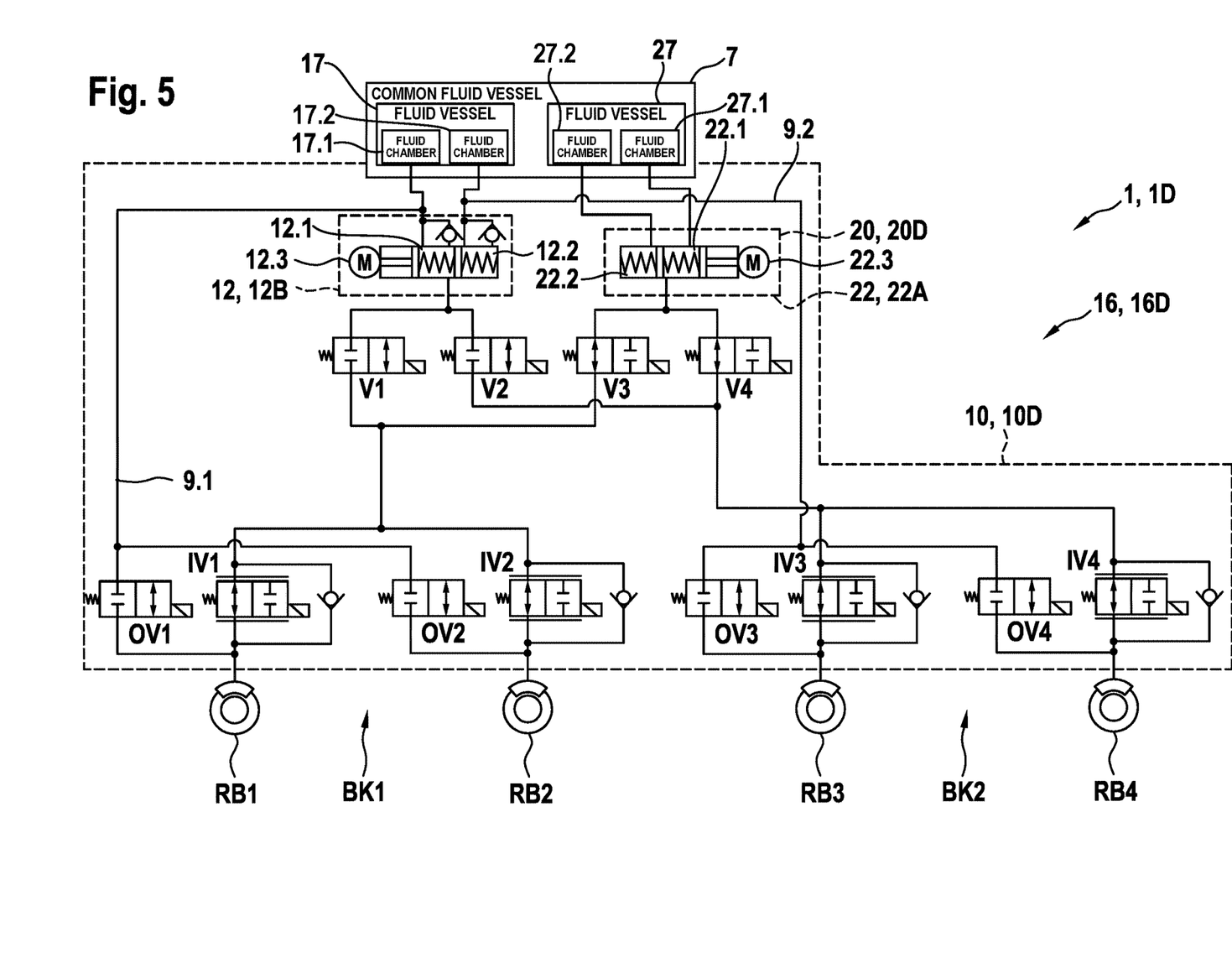
FIG. 5 shows a diagrammatic hydraulic circuit diagram of a fourth exemplary embodiment of a multiple-circuit hydraulically open brake system according to the disclosure, in particular for a highly automated or autonomous vehicle.

As can be seen from FIG. 5, furthermore, in the fourth exemplary embodiment which is shown of the brake system 1D, the first pressure generator 12 is of dual-circuit configuration and comprises a plunger system 12B with a piston/cylinder unit, which has two pistons and two chambers 12.1, 12.2, and a drive 12.3. The drive 12.3 is configured as an electric motor and moves the two pistons for pressure setting in the chambers 12.1, 12.2 counter to the force of corresponding restoring springs. The second pressure generator 22 is of dual-circuit configuration, and comprises a plunger system 22A with a piston/cylinder unit, which has two pistons and two chambers 22.1, 22.2, and a drive 22.3. The drive 22.3 is configured as an electric motor and moves the two pistons for pressure setting in the chambers 22.1, 22.2 counter to the force of corresponding restoring springs.

As can be seen from FIG. 5, furthermore, the first fluid vessel 17 comprises two fluid chambers 17.1, 17.2, a first fluid chamber 17.1 being connected hydraulically to a first chamber 12.1 of the first plunger system 12B and a first pressure relief path 9.1. A second fluid chamber 17.2 is connected hydraulically to a second chamber 12.2 of the first plunger system 12B and a second pressure relief path 9.2. In addition, the first chamber 12.1 is assigned to the first brake circuit BK1, and the second chamber 12.2 is assigned to the second brake circuit BK2. In addition, the modulation unit 16C for the first pressure generator 12 comprises two suction lines with a check valve, which suction lines additionally connect the chambers 12.1, 12.2 of the first plunger system 12B hydraulically to the first fluid vessel 17. The second fluid vessel 27 comprises two fluid chambers 27.1, 27.2, a first fluid chamber 27.1 being connected hydraulically to a first chamber 22.1 of the second plunger system 22A, and a second fluid chamber 27.2 being connected hydraulically to a second chamber 22.2 of the second plunger system 22A. In addition, the first chamber 22.1 is assigned to the second brake circuit BK2, and the second chamber 22.2 is assigned to the first brake circuit BK1. The piston/cylinder units of the first and second plunger system 12A, 22A are configured such that flow can pass through them in the currentless state, with the result that brake fluid can flow through the corresponding chambers 12.1, 12.2, 22.1, 22.2.

As can be seen from FIG. 5, furthermore, in the exemplary embodiment which is shown, the first shut-off valve V1 and the second shut-off valve V2 are configured in each case as normally open solenoid valves, and the third shut-off valve V3 and the fourth shut-off valve V4 are configured as normally closed solenoid valves, the second evaluation and control unit 14 actuating the shut-off valves V1, V2, V3, V4. Therefore, in the case of said embodiment, the shut-off valves V1, V2, V3, V4 belong to the secondary system 20D, and are supplied with energy by the second energy supply unit EV2. As a result of the normally open configuration of the first shut-off valve V1 and the second shut-off valve V1, the first pressure generator 12 is connected hydraulically to the wheel brakes RB1, RB2, RB3, RB4. As a result of the normally closed configuration of the third shut-off valve V3 and the fourth shut-off valve V4, the second pressure generator 22 is disconnected hydraulically from the wheel brakes RB1, RB2, RB3, RB4. Therefore, during normal operation, during which the first pressure generator 12 generates the pressure for the wheel brakes RB1, RB2, RB3, RB4, an actuation of the shut-off valves V1, V2, V3, V4 is not required, in order to connect the first pressure generator 12 hydraulically to the wheel brakes RB1, RB2, RB3, RB4, and to disconnect the second pressure generator 22 hydraulically from the wheel brakes RB1, RB2, RB3, RB4. In addition, the wheel brakes RB1, RB2, RB3, RB4 are connected via the first pressure generator 22 to the first fluid vessel 17, in order for it to be possible, in the currentless or passive state, for a temperature-induced expansion of the brake fluid to be compensated for by way of what is known as "breathing". Therefore, "breathing by way of the main system 10D" is spoken of in this context.

In the case of the operating method according to the invention disclosure for the above-described multiple-circuit hydraulically open brake system 1, 1A, 1B, 1C, 1D, in particular for a highly automated or autonomous vehicle, the main system 10, 10A, 10B, 10C, 10D increases or reduces or holds the pressure in the brake circuits BK1, BK2 by means of the first pressure generator 12 during normal operation, and carries out the individual brake pressure modulation in the at least two wheel brakes RB1, RB2, RB3, RB4 by means of the modulation unit 16, 16A, 16B, 16C, 16D. In the case of failure of the main system 10, 10A, 10B, 10C, 10D, the secondary system 20, 20A, 20B, 20C, 20D increases or reduces or holds the pressure in the brake circuits BK1, BK2 by means of the second pressure generator 22, and the individual brake pressure modulation in the at least two wheel brakes RB1, RB2, RB3, RB4 is dispensed with.

During normal operation, the first shut-off valve V1 and the second shut-off valve V2 are transferred into the open state, and the third shut-off valve V3 and the fourth shut-off valve V4 are transferred into the closed state. The drive 12.3 of the first pressure generator 12 is actuated correspondingly in order to increase the pressure or in order to reduce the pressure or in order to hold the pressure in the brake circuits BK1, BK2.

Furthermore, during normal operation, the associated inlet valve IV1, IV2, IV3, IV4 is opened and the associated outlet valve OV1, OV2, OV3, OV4 is closed for individually increasing the pressure in an associated wheel brake RB1, RB2, RB3, RB4. The associated inlet valve IV1, IV2, IV3, IV4 and the associated outlet valve OV1, OV2, OV3, OV4 are closed for individually holding the pressure in an associated wheel brake RB1, RB2, RB3, RB4. The associated inlet valve IV1, IV2, IV3, IV4 is closed and the associated outlet valve OV1, OV2, OV3, OV4 is opened for individually reducing the pressure in an associated wheel brake RB1, RB2, RB3, RB4.

In the case of failure of the main system 10, 10A, 10B, 10C, 10D, the first shut-off valve V1 and the second shut-off valve V2 are transferred into the closed state, and the third shut-off valve V3 and the fourth shut-off valve V4 are transferred into the open state, the drive 22.3 of the second pressure generator 22 being actuated correspondingly in order to increase the pressure or in order to reduce the pressure or in order to hold the pressure in the brake circuits BK1, BK2.

In the case of a single-circuit configuration of the first pressure generator 12, in the case of a detected leak in a brake circuit BK1, BK2, the associated shut-off valve V1, V2 is closed. In the case of a detected leak in one of the wheel brakes RB1, RB2, RB3, RB4, the associated inlet valve IV1, IV2, IV3, IV4 is closed.

Said method can be implemented, for example, in software or hardware or in a mixed form consisting of software and hardware, for example in a control unit.

Embodiments of the present disclosure provide a multiple-circuit hydraulically open brake system without mechanical and/or hydraulic intervention by way of the driver, in particular for a highly automated or autonomous vehicle, and a corresponding operating method, the pressure generators which are used and are connected hydraulically in parallel acting on all the wheel brakes of the vehicle by way of the hydraulic interconnection via the modulation unit.

The invention claimed is:

1. A multiple-circuit hydraulically open brake system, comprising:
   a first brake circuit having a first pressure relief path;
   a second brake circuit having a second pressure relief path;
   at least two wheel brakes including at least one first wheel brake assigned to the first brake circuit and at least one second wheel brake assigned to the second brake circuit;
   at least one fluid vessel;
   two pressure generators connected hydraulically in parallel between the at least one fluid vessel and the at least one first and second wheel brakes;
   a modulation unit configured to hydraulically connect the two pressure generators to the at least two wheel brakes and to individually modulate brake pressure in the at least two wheel brakes;
   a main system to which a first pressure generator of the two pressure generators is assigned, the main system comprising:
     a first energy supply; and
     a first evaluation and control unit;
   a first shut-off valve configured to connect the main system to the at least one first wheel brake;
   a second shut-off valve configured to connect the main system to the at least one second wheel brake;
   a secondary system to which a second pressure generator of the two pressure generators is assigned, the secondary system comprising:
     a second energy supply, which is independent of the first energy supply; and
     a second evaluation and control unit configured to actuate the second pressure generator;
   a third shut-off valve configured to connect the secondary system to the at least one first wheel brake; and
   a fourth shut-off valve configured to connect the secondary system to the at least one second wheel brake,
   wherein components of the modulation unit are assigned to the main system such that that said components of the modulation unit and the first pressure generator are actuated by the first evaluation and control unit and are supplied with energy by the first energy supply.

2. The brake system as claimed in claim 1, wherein the first pressure generator is of single-circuit or dual-circuit configuration.

3. The brake system as claimed in claim 1, wherein the second pressure generator is of single-circuit or dual-circuit configuration.

4. The brake system as claimed in claim 1, wherein at least one of the first and second evaluation and control units is configured to actuate the first, second, third, and fourth shut-off valves in such a way that, in the case of activation of one of the two pressure generators, hydraulic fluid is not conducted through the other one of the two pressure generators.

5. The brake system as claimed in claim 4, wherein:
   each of the first and second shut-off valves is configured as a normally closed solenoid valve, and each of the third and fourth shut-off valves is configured as a normally open solenoid valve, and
   the first evaluation and control unit is configured to actuate the first, second, third, and fourth shut-off valves.

6. The brake system as claimed in claim 4, wherein:
   each of the first and second shut-off valves is configured as a normally open solenoid valve, and each of the third and fourth shut-off valves is configured as a normally closed solenoid valve, and
   the second evaluation and control unit is configured to actuate the first, second, third, and fourth shut-off valves.

7. The brake system as claimed in claim 1, wherein:
   the at least one fluid vessel includes a common fluid vessel to which the main system and the secondary system are assigned; or
   the at least one fluid vessel includes a first fluid vessel assigned to the main system and a second fluid vessel assigned to the secondary system, the first fluid vessel having a first chamber and the second fluid vessel having a second chamber.

8. The brake system as claimed in claim 1, wherein the first pressure generator is configured as a plunger system or as a pump system.

9. The brake system as claimed in claim 8, wherein:
the at least one fluid vessel includes a first fluid vessel assigned to the main system and a second fluid vessel assigned to the secondary system, the first fluid vessel having a first chamber and the second fluid vessel having a second chamber; and
the first pressure generator includes at least one suction line with a check valve, the at least one suction line additionally hydraulically connecting the first pressure generator to the first fluid vessel.

10. The brake system as claimed in claim 1, wherein the second pressure generator is configured as a plunger system or as a pump system.

11. The brake system as claimed in claim 8, wherein the plunger system has a piston/cylinder unit comprising:
at least one piston;
at least one chamber; and
a drive configured to move the at least one piston counter to a force of a restoring spring so as to set a pressure in the at least one chamber.

12. The brake system as claimed in claim 8, wherein the pump system has at least one pump and at least one drive which drives the at least one pump.

13. The brake system as claimed in claim 7, wherein, during an individual brake pressure modulation in one of the at least two wheel brakes, brake fluid which is discharged via the one of the at least two wheel brakes is returned via at least one of the first and second pressure relief paths either into the first fluid vessel or into the second fluid vessel.

14. The brake system as claimed in claim 1, wherein the first pressure generator, the second pressure generator and the modulation unit are arranged in a common hydraulic block.

15. The brake system as claimed in claim 1, wherein the first pressure generator and the modulation unit are arranged in a first hydraulic block, and the second pressure generator is arranged in a second hydraulic block.

16. An operating method for a multiple-circuit hydraulically open brake system including a first brake circuit having a first pressure relief path; a second brake circuit having a second pressure relief path; at least two wheel brakes including at least one first wheel brake assigned to the first brake circuit and at least one second wheel brake assigned to the second brake circuit; at least one fluid vessel; two pressure generators connected hydraulically in parallel between the at least one fluid vessel and the at least one first and second wheel brakes; a modulation unit configured to hydraulically connect the two pressure generators to the at least two wheel brakes and to individually modulate brake pressure in the at least two wheel brakes; a main system to which a first pressure generator of the two pressure generators is assigned, the main system comprising a first energy supply and a first evaluation and control unit; a first shut-off valve configured to connect the main system to the at least one first wheel brake; a second shut-off valve configured to connect the main system to the at least one second wheel brake; a secondary system to which a second pressure generator of the two pressure generators is assigned, the secondary system comprising a second energy supply, which is independent of the first energy supply; and a second evaluation and control unit configured to actuate the second pressure generator; a third shut-off valve configured to connect the secondary system to the at least one first wheel brake; and a fourth shut-off valve configured to connect the secondary system to the at least one second wheel brake, wherein components of the modulation unit are assigned to the main system such that that said components of the modulation unit and the first pressure generator are actuated by the first evaluation and control unit and are supplied with energy by the first energy supply, the method comprising:
during normal operation, operating the main system to increase, reduce, or hold a pressure in the first and second brake circuits with the first pressure generator, and to carry out the individual brake pressure modulation in the at least two wheel brakes with the modulation unit; and
upon failure of the main system, operating the secondary system to increase, reduce, or hold the pressure in the first and second brake circuits with the second pressure generator, and to dispense with the individual brake pressure modulation in the at least two wheel brakes.

17. The operating method as claimed in claim 16, further comprising, during the normal operation:
opening the first shut-off valve and the second shut-off valve;
closing the third shut-off valve and the fourth shut-off valve; and
actuating a drive of the first pressure generator to increase, reduce, or hold the pressure the first and second brake circuits.

18. The operating method as claimed in claim 16, further comprising, during the normal operation:
opening an associated inlet valve and closing an associated outlet valve to increase the pressure individually in an associated wheel brake of the at least two wheel brakes;
closing the associated inlet valve and the associated outlet valve to hold the pressure individually in the associated wheel brake; and
closing the associated inlet valve and opening the associated outlet valve to reduce the pressure individually in the associated wheel brake.

19. The operating method as claimed in claim 16, further comprising, in the case of failure of the main system:
closing the first shut-off valve and the second shut-off valve and opening the third shut-off valve and the fourth shut-off valve;
actuating a drive of the second pressure generator to increase, reduce, or hold the pressure in the first and second brake circuits.

20. The brake system as claimed in claim 1, wherein the brake system is installed in an automated or autonomous vehicle.

* * * * *